(12) United States Patent
Toneaki (10) Patent No.: US 8,368,241 B2
(45) Date of Patent: Feb. 5, 2013

(54) WIND DRIVEN POWER GENERATOR (76) Inventor: Yasunobu Toneaki, Shiga (JP)

( * ) Notice: Subject to any disclaimer, the term of this patent is extended or adjusted under 35 U.S.C. 154(b) by 362 days.

(21) Appl. No.: 12/936,264

(22) PCT Filed: Apr. 3, 2009

(86) PCT No.: PCT/JP2009/001562
§ 371 (c)(1),
(2), (4) Date: Oct. 4, 2010

(87) PCT Pub. No.: WO2009/122754
PCT Pub. Date: Oct. 8, 2009

(65) Prior Publication Data
US 2011/0025060 A1 Feb. 3, 2011

(30) Foreign Application Priority Data
Apr. 5, 2008 (JP) .................. 2008-098819

(51) Int. Cl.
F03D 9/00 (2006.01)
(52) U.S. Cl. .................... 290/44; 244/155 A
(58) Field of Classification Search ............ 290/44, 290/55; 244/155 A
See application file for complete search history.

(56) References Cited

U.S. PATENT DOCUMENTS

| 3,987,987 | A | 10/1976 | Payne et al. |
| 6,520,454 | B2 * | 2/2003 | Winner ............... 244/155 A |
| 8,100,366 | B2 * | 1/2012 | Milanese et al. ........ 244/155 A |
| 2002/0040948 | A1 | 4/2002 | Ragner |
| 2011/0210559 | A1 * | 9/2011 | Zanetti et al. ............ 290/55 |

FOREIGN PATENT DOCUMENTS

| JP | 4-237877 A | 8/1992 |
| JP | 2004-232461 A | 8/2004 |
| JP | 2008-95517 A | 4/2008 |
| JP | 4208183 B2 | 1/2009 |

OTHER PUBLICATIONS

Official Communication issued in International Patent Application No. PCT/JP2009/001562, mailed on May 19, 2009.

* cited by examiner

Primary Examiner — Vanessa Girardi
(74) Attorney, Agent, or Firm — Keating & Bennett, LLP (57) ABSTRACT A power generator using a floating object and exhibiting further improved power generation efficiency includes a floating object including a floating body arranged to catch wind, a plurality of posture control strings, and a posture control instrument, at least one first control string connected to the posture control instrument, a first control string take-in device arranged to take the at least one first control string into a first base body, a forward/backward movement control device arranged to control forward/backward movements of the posture control strings, a first winding device arranged to wind a proximal send of the at least one first control string, a second control string connected to the posture control instrument, a second control string take-in device arranged to take the second control string into a second base body installed apart from the first base body, and a second winding device around which a proximal end of the second control string is wound. The at least one first control string or the posture control instrument that mounts a communication device is arranged to control a front/rear inclination angle θ of the floating object, and the second control string is reeled out/taken up in accordance with the front/rear inclination to generate electric power.

13 Claims, 4 Drawing Sheets

WIND DRIVEN POWER GENERATOR

BACKGROUND OF THE INVENTION

1. Field of the Invention

The present invention relates to a power generator utilizing a floating object for catching wind high in the sky to float.

2. Description of the Related Art

As a power generator for generating power by utilizing wind power, there is a so-called wind power generator. The wind power generator generates electric power by rotating a shaft (rotor) of a power generator interlocked with blades rotated by wind power. In general, the wind power generator is a gigantic facility located high above the ground and requiring strong groundwork under the ground in order to support large blades for catching wind far from the ground and rotating.

To prevent an increase in size of such facilities, power generators using floating objects have been proposed in recent years. For example, a power generator described in Japanese Unexamined Patent Publication No. 2004-232461 generates electric power by floating two floating devices (floating objects) in the air and drawing and reeling out these floating devices (floating objects) in a complementary manner by using wire ropes (control strings) connected to a generator on the ground to rotate a rotor of the generator alternately in opposite directions. A power generator described in Japanese Patent No. 4208153 and invented by the inventor of the present application generates electric power by floating one floating object in the air and repeating reeling out of the floating object by a control string connected to a winding shaft interlocked with an electricity generator on the ground to rotate a rotor of the electricity generator and drawing the floating body to rotate the winding shaft in a reverse direction to that during the electricity generation. Because the floating object is in the air and the generator is on the ground, such a power generator has advantages that the facility is small and that a degree of flexibility of where to construct the facility increases.

However, the power generator using the floating object has a possibility of improvement for increasing power generation efficiency because the history of study of this power generator is short, for example.

SUMMARY OF THE INVENTION

Preferred embodiments of the present invention have been developed in view of the above circumstances and provide a power generator using a floating object and exhibiting further improved power generation efficiency.

A power generator according to a preferred embodiment of the present invention includes a floating object arranged to catch wind to float and including a floating body arranged to catch the wind; a plurality of posture control strings connected to a plurality of positions of the floating body near an outer periphery of the floating body; and a posture control instrument to which at least a portion of the plurality of posture control strings is connected; at least one first control string including a portion that includes a tip end connected to the posture control instrument; a first control string take-in device arranged to take the at least one first control string into a first base body; a forward/backward movement control device arranged to control respective forward/backward movements of the plurality of posture control strings; a first winding device around which a proximal end of the at least one first control string is wound, which rotates in one direction when the at least one first control string is reeled out, and which rotates in the other direction to take up the at least one first control string; a second control string including a tip end connected to the posture control instrument; a second control string take-in device arranged to take the second control string into a second base body installed apart from the first base body; and a second winding device around which a proximal end of the second control string is wound, which rotates in one direction to generate electric power when the second control string is reeled out, and which rotates in the other direction to take up the second control string. The at least one first control string or the posture control instrument that mounts a communication device is arranged to control at least front/rear inclination of the floating object, and reeling out and taking up operations of the second control string are carried out according to the front/rear inclination to generate electric power.

Preferably, another portion of the at least one first control string, which is not connected to the posture control instrument, passes through a through hole formed in the posture control instrument.

Preferably, the first winding device rotates in the one direction to generate electric power when the at least one first control string is reeled out. More preferably, the power generator further includes a mechanism arranged to selectively connect or disconnect the second control string and the posture control instrument.

Preferably, the power generator further includes: a third control string including a tip end connected to the posture control instrument; a third control string take-in device arranged to take the third control string into a third base body installed apart from the first base body and the second base body; and a third winding device around which a proximal end of the third control string is wound, which rotates in one direction to generate electric power when the third control string is reeled out, and which rotates in the other direction to take up the third control string. The reeling out and taking up operations of the third control string are carried out according to the front/rear inclination to generate electric power.

According to various preferred embodiments of the present invention, the front/rear inclination of the floating object is controlled by the at least one first control string while lengths of the at least one first control string is maintained substantially constant, and the reeling out and taking up operations of the second control string are carried out according to the front/rear inclination to generate electric power. Therefore, the floating object can effectively catch wind to make the most of wind energy and it is possible to further improve power generation efficiency.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
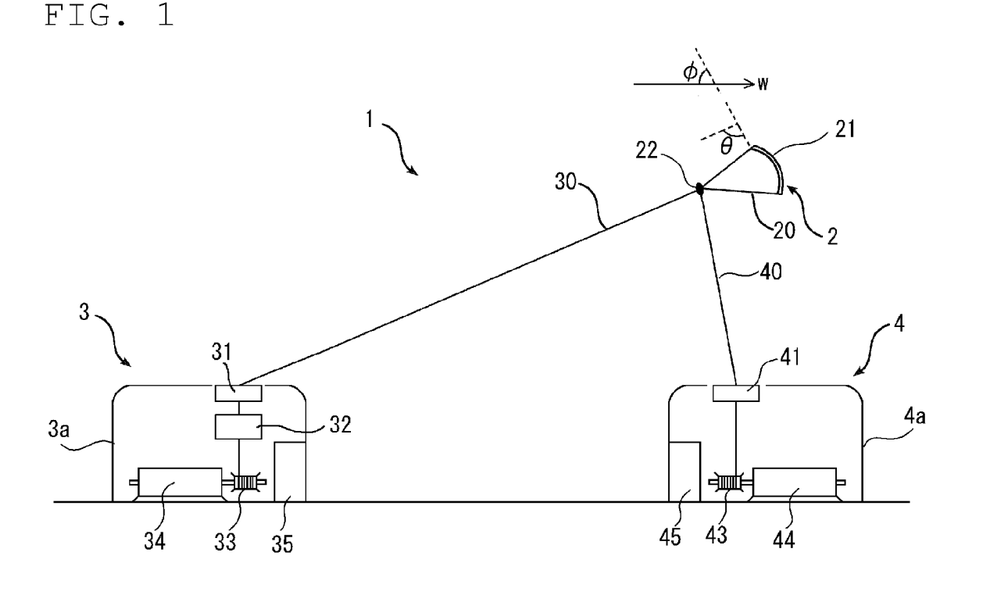
FIG. 1 is a side schematic diagram of a general structure of a power generator according to a first preferred embodiment of the present invention.

Preferred embodiments of the present invention will be described with reference to the drawings. FIG. 1 is a side schematic diagram of a general structure of a power generator 1 according to a first preferred embodiment of the present invention. The power generator 1 mainly includes a floating object 2 arranged to catch wind to float, first control strings 30 connected to the floating object 2, a first base body 3, a second control string 40 connected to the floating object 2, and a second base body 4. The first base body 3 houses a first control string take-in device 31, a forward/backward movement control device 32, a first winding device 33, a first power generating device 34 and a first control device 35 in a case 3a to carry out forward/backward movements of the first control strings 30. The second base body 4 houses a second control string take-in device 41, a second winding device 43, a second power generating device 44 and a second control device 45 in a case 4a to carry out forward/backward movements of the second control string 40. The floating object 2 preferably has a substantially quadrilateral shape in a plan view in this preferred embodiment and its left-right direction is perpendicular to a plane of paper of FIG. 1. Examples of the floating object 2 are so-called kites and paragliders. The first base body 3 and the second base body 4 are on the land, the sea, a lake, or a river and respective portions housed in the base bodies are actuated for power generation. The first base body 3 and the second base body 4 are installed apart from each other in a plane so that the first control strings 30 and the second control string 40 are connected to the floating object 2 from different directions. It is applicable only that the positions of the first base body 3 and the second base body 4 with respect to the floating object 2 be relatively controllable. In the case of the first base body 3 and the second base body 4 on the sea, a lake, or a river, the positions of ships (or a ship) or the like, on which the first base body 3 and the second base body 4 are installed, may be retained with respect to a bottom of a water space by using an anchor or the like. Furthermore, power generation may be carried out even if the ships (or a ship) or the like are moving.

Figure 2:
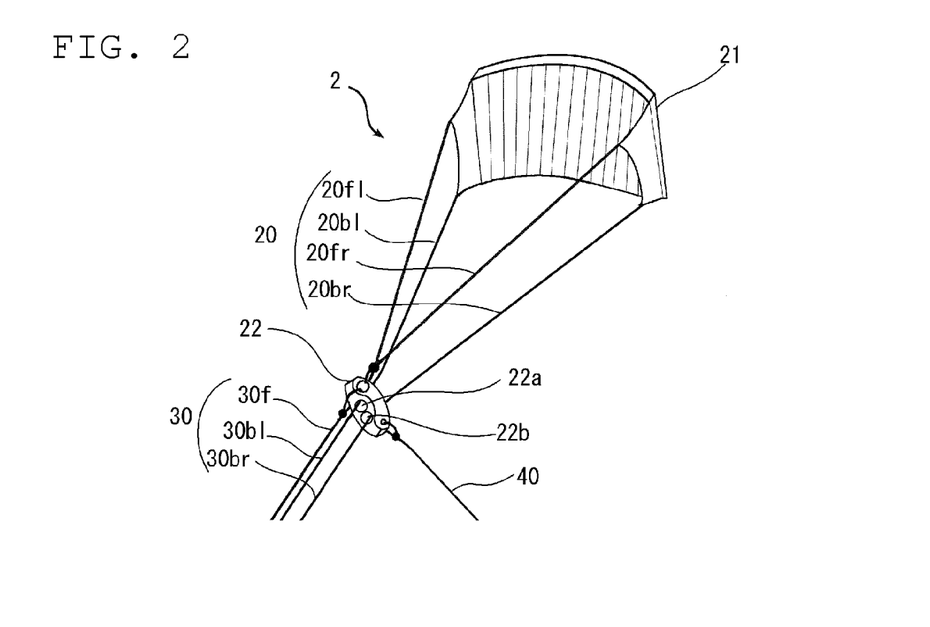
FIG. 2 is a perspective view of a floating object of the same.

FIG. 2 is a more detailed perspective view of the floating object 2. The floating object 2 includes a floating body 21 made of a light and flexible material such as nylon and catching wind, posture control strings 20 having tip ends connected to a plurality of positions (e.g., four corners) of the floating body 21 near an outer periphery of the floating body 21, and a posture control instrument 22 to which at least a portion of the posture control strings 20 is connected. Front/rear inclination and a right/left posture of the floating body 21 are controlled by the first control strings 30 through the posture control strings 20 and the posture control instrument 22. A front/rear inclination angle θ of the floating body 21 (floating object 2) is made by a virtual line connecting a front end and a rear end of the floating body 21 with respect to an axis of the first control string 30 (see FIG. 1). To the posture control instrument 22, proximal ends of a portion of the posture control strings 20, tip ends of a portion of the first control strings 30, and a tip end of second control string 40 are connected. Portions near the tip ends of the rest of the first control strings 30 pass through the through holes 22a and 22b formed in the posture control instrument 22 and serve as the rest of the posture control strings 20.

In this preferred embodiment, the posture control strings 20 include strings 20fl, 20fr, 20bl, and 20br for front portion left control, front portion right control, rear portion left control, and rear portion right control, respectively, and the strings 20fl and 20fr are connected to a front portion of the posture control instrument 22. The first control strings 30 include strings 30f, 30bl, and 30br for front portion control, rear portion left control, and rear portion right control, respectively, and the string 30f is connected to the posture control instrument 22. The strings 30bl and 30br respectively pass through the two through holes 22a and 22b formed in the posture control instrument 22 and serve as the strings 20bl and 20br forming the posture control strings 20. The two through holes 22a and 22b may be formed as a common hole. To allow the respective strings 30bl and 30br in the through holes 22a and 22b to move smoothly, pulleys in contact with the strings 30bl and 30br may be provided.

Figure 3:
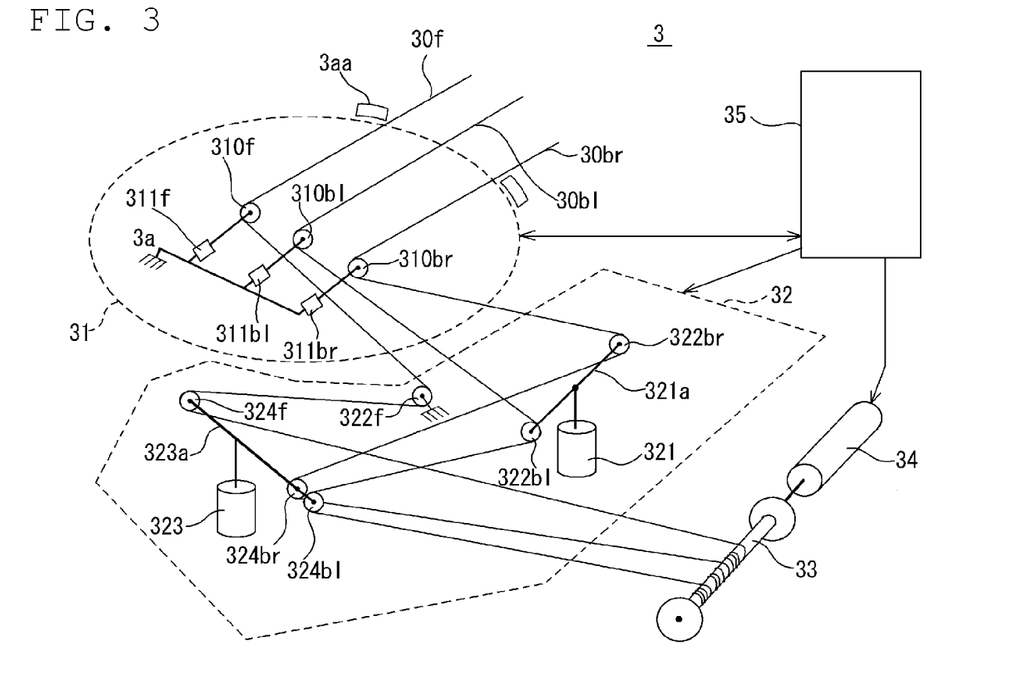
FIG. 3 is a perspective schematic diagram showing structures of respective portions provided to a first base body of the same.

FIG. 3 is a perspective schematic diagram showing structures of respective portions provided to the first base body 3. Housed in the case 3a of the first base body 3 are the first control string take-in device 31 arranged to take in the first control strings 30 connected to the floating object 2 into the first base body 3 and sending them to respective subsequent portions, the forward/backward movement control device 32 arranged to control respective forward/backward movements of the strings 30f, 30bl and 30br defining the first control strings 30 to thereby control respective forward/backward movements of the strings 20fl, 20fr, 20bl, and 20br defining the posture control strings 20, the first winding device 33 around which proximal ends of the first control strings 30 are wound via the forward/backward movement control device 32, which rotates in one direction when the first control strings 30 are reeled out, and which rotates in the other direction to take up the first control strings 30, a first power generating device 34 arranged to control rotation of the first winding device 33, and the first control device 35 having a computer or the like arranged and programmed to control these respective portions described above and communicating with the second base body 4.

Figure 4:
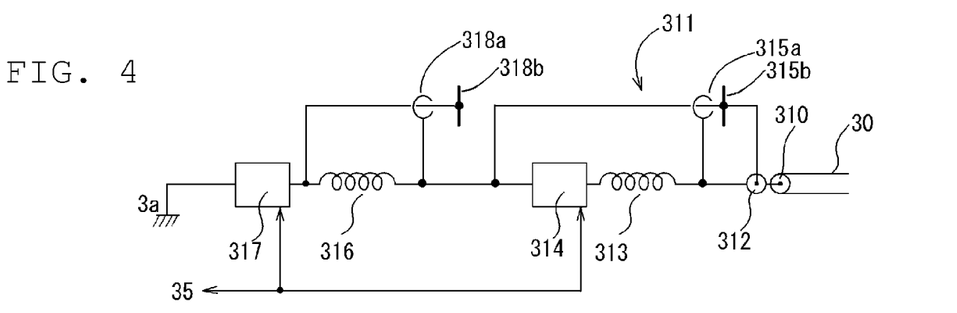
FIG. 4 is a diagram showing a structure of a pulley controller of the same.

The first control string take-in device 31 preferably includes three pulleys 310f, 310bl, and 310br (collectively referred to as control string take-in pulleys 310) over which the strings 30f, 30bl, and 30br defining the first control strings 30 connected to the floating object 2 are respectively looped, and controllers 311f, 311bl, and 311br (collectively referred to as pulley controllers 311) connected to shafts of the respective control string take-in pulleys 310. FIG. 4 is a diagram showing a structure of the pulley controller 311. The pulley controller 311 is provided with a derailment preventing pulley 312 arranged to hold one of the strings 30f, 30bl and 30br (collectively referred to as strings 30) between the related control string take-in pulley 310 and itself to prevent derailment thereof, a light load spring 313 having one end connected to the shaft of the control string take-in pulley 310 to constantly provide proper tension to the strings 30 to thereby prevent slack of the strings 30, and a light load sensor 314 connected to the other end of the light load spring 313 to measure small tension exerted on the strings 30. The derailment preventing pulley 312 may be a simple retaining member. Pulley separation preventing members 315a and 315b arranged to prevent the control string take-in pulley 310 from moving a certain or longer distance away from the derailment preventing pulley 312 are provided and, when a heavy load is applied by the strings 30 to the control string take-in pulley 310, the one pulley separation preventing member 315a connected to the shaft of the control string take-in pulley 310 comes in contact with the other pulley separation preventing member 315b connected to a shaft of the derailment preventing pulley 312, and the derailment preventing pulley 312 moves together with the control string take-in pulley 310. The other pulley separation preventing member 315b is connected to the other end of the light load sensor 314. The pulley controller 311 is also provided with a heavy load spring 316, which has one end connected to the other end of the light load sensor 314 and is actuated upon exertion of the heavy load, and a heavy load sensor 317 connected to the other end of the heavy load spring 316 to measure large tension exerted on the strings 30. The other end of the heavy load sensor 317 is connected to the case 3a. The heavy load spring 316 is preferably provided with an absorber which allows the spring 316 to extend slowly and to return fast. To prevent breakage, an excessive extension preventing member 318a and 318b arranged to prevent the heavy load spring 316 from extending to a certain or greater length is provided and, when the heavy load spring 316 extends the certain length, the one excessive extension preventing member 318a connected to the one end of the heavy load spring 316 comes in contact with the other excessive extension preventing member 318b connected to the other end of the heavy load spring 316.

The first control string take-in device 31 works to prevent the slack of the strings 30f, 30bl and 30br defining the first control strings 30 and measures the tension exerted on the strings 30f, 30bl and 30br by using the light load sensor 314 and the heavy load sensor 317 to use the tension as information to control the forward/backward movement control device 32 and the like through the first control device 35.

On a top of the first control string take-in device 31, there may be provided a pipe-shaped body 3aa (see FIGS. 5A and 5B) which is fixed to a ceiling of the case 3a and flares like a morning glory flower in a direction of the ceiling and through which the first control strings 30 pass. An air blower (not shown) may be provided around a lower portion of the pipe-shaped body 3aa. As a result, if the floating object 2 is arranged to land on the first base body 3, it is possible to stably assist takeoff (departure) and landing of the floating object 2 by blowing air from the pipe-shaped body 3aa. A roller or the like may be provided to a portion of the pipe-shaped body 3aa in contact with the first control strings 30.

Figure 5:
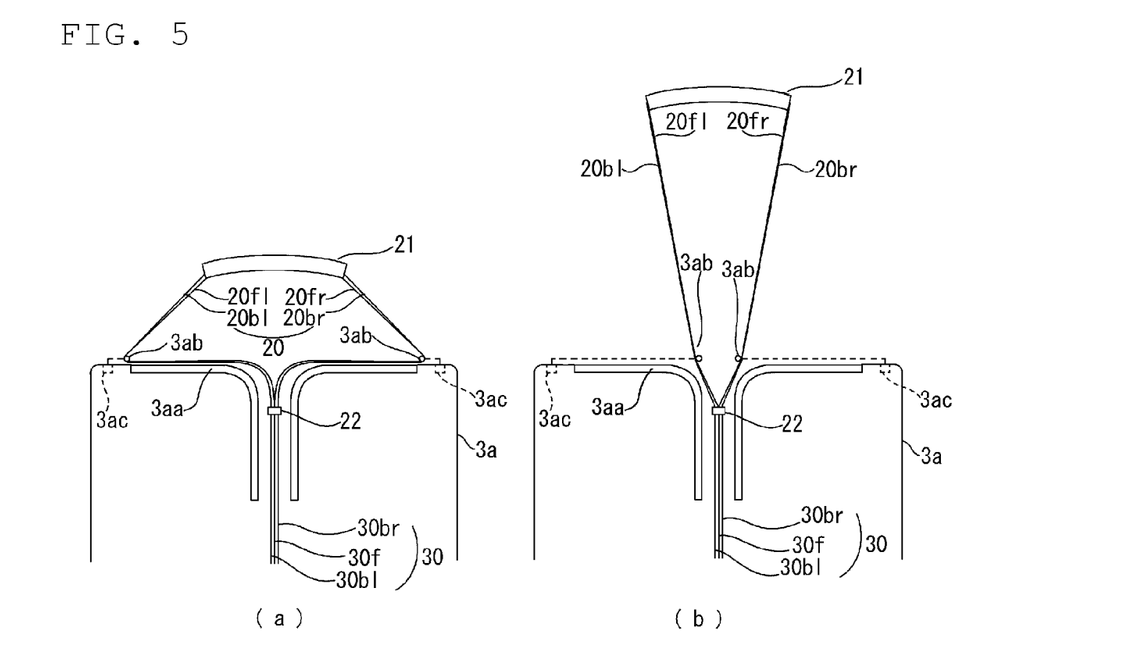
FIGS. 5A and 5B are diagrams for explaining an example of a portion around a pipe-shaped body of the same.

Furthermore, as shown in FIGS. 5A and 5B, there may be provided at least two housing control bodies 3ab, 3ab movable from a position near the center of the pipe-shaped body 3aa to positions near side surfaces of the case 3a. To draw the posture control instrument 22 of the floating object 2 into the pipe-shaped body 3aa for housing, the housing control bodies 3ab, 3ab hook at least two of the posture control strings 20 (front portion left control, front portion right control, rear portion left control, and rear portion right control strings 20fl, 20fr, 20bl, and 20br) and move toward the side surfaces of the case 3a to thereby expand the floating body 21 in a horizontal direction. Pulleys are attached to portions of the housing control bodies 3ab in contact with the posture control strings 20 to facilitate sliding. For example, to allow the housing control bodies 3ab to hook the posture control strings 20 and to move, the housing control bodies 3ab may be provided with hook-shaped portions so as to be able to hold the posture control strings 20 and the housing control bodies 3ab may be pulled by robot arms or the like from the positions around the pipe-shaped body 3aa (e.g., positions shown with sign 3ac in FIGS. 5A and 5B) or from an end of the pipe-shaped body 3aa after a sensor recognizes positions and hold of the posture control strings 20. Alternatively, the housing control bodies 3ab may be inserted from a perpendicular direction to a plane of paper of FIGS. 5A and 5B in a horizontal position near the center of the pipe-shape body 3aa and the housing control bodies 3ab may be moved along a surface of the pipe-shaped body 3aa. For takeoff, the housing control bodies 3ab, 3ab are moved freely as shown in FIGS. 5A and 5B until the floating object 2 rides on the wind. For landing, the floating object 2 is brought into the state shown in FIG. 5A from the state shown in FIG. 5B and is housed. In FIGS. 5A and 5B, the second control string 40 is not shown.

The forward/backward movement control device 32 is provided with a right/left posture control motor 321 to a rotating shaft of which a fixing member 321a is connected perpendicularly, a rear portion left control pulley 322bl over which the string 30bl is looped, and a rear portion right control pulley 322br over which the string 30br is looped. Shafts of the pulley 322bl and the pulley 322br are parallel to each other, the right/left posture control motor 321 is disposed at a center of the fixing member 321a connecting the shafts, and the pulley 322bl and the pulley 322br are respectively disposed at opposite ends of the fixing member 321a. The forward/backward movement control device 32 is also provided with a front/rear posture control motor 323 to a rotating shaft of which a fixing member 323a is connected perpendicularly, a front portion control pulley 324f over which the string 30f is looped, another rear portion left control pulley 324bl over which the string 30bl is looped, and another rear portion right control pulley 324br over which the string 30br is looped. In a preceding stage of the pulley 324f, a pulley 322f arranged to adjust an angle of the string 30f is provided. Shafts of the pulleys 324f, 324bl, and 324br are parallel to each other, the front/rear posture control motor 323 is disposed at a center of the fixing member 323a connecting the shafts, the pulley 324f is positioned at one end of the fixing member 323a, and the pulleys 324bl and 324br are positioned at the other end thereof. The pulley 324bl and the pulley 324br may be disposed in an axial direction to share a shaft.

The pulley 322bl and the pulley 322br move in opposite directions to each other according to rotation of the shaft of the right/left posture control motor 321 to thereby change lengths of the strings 30bl and 30br from themselves to the pulleys 310bl and 310br of the first control string take-in device 31. As a result, by changing relative lengths of the string 30bl and the string 30br from the first base body 3 to the floating object 2, differential control of the right/left posture of the floating object 2 is carried out. The pulley 324f and the pulleys 324bl (and 324br) move in opposite directions to each other according to rotation of the shaft of the front/rear posture control motor 323 to thereby change lengths of the strings 30f, 30bl, and 30br from themselves to the pulleys 310f, 310bl, and 310br of the first control string take-in device 31. As a result, by changing relative lengths of the string 30f and the strings 30bl (and 30br) from the first base body 3 to the floating object 2, differential control of the front/rear inclination angle θ of the floating object 2 is carried out. In this way, the forward/backward movement control device 32 individually controls the forward/backward movements of the strings 30f, 30bl, and 30br defining the first control strings 30 with respect to the first control string take-in device 31 of the first base body 3.

As described above, the second base body 4 is installed apart from the first base body 3. Housed in the case 4a of the second base body 4 are the second control string take-in device 41 arranged to take in the second control string 40 connected to the floating object 2, the second winding device 43 around which a proximal end of the second control string 40 is wound via the second control string take-in device 41, which rotates in one direction when the second control string 40 is reeled out, and which rotates in the other direction to take up the second control string 40, the second power generating device 44 which controls rotation of the second winding device 43 and which operates as an electricity generator when the second winding device 43 rotates in the one direction, and the second control device 45 arranged to control the respective portions described above and communicating with the first base body 3. The second base body 4 is not provided with a forward/backward movement control device to control the posture of the floating object 2. Details of the respective portions of the second base body 4 are similar to those of the respective corresponding portions of the first base body 3 described above. If the floating object 2 is arranged to land on the second base body 4, members similar to the pipe-shaped body 3aa and the housing control bodies 3ab described above may be provided to the second base body 4.

Next, overall operation of the power generator 1 will be described. The power generator 1 starts operating when wind is blowing substantially from the first base body 3 toward the second base body 4 in the sky away from the ground and above the first base body 3 and the second base body 4. The floating object 2 departs from the first base body 3, the second base body 4, or the like. The floating object 2 catches strong wind in the sky to generate lift and drag, and soars while its posture and position are controlled by reeling out or taking up (drawing) of the first control strings 30 and the second control string 40. In this case, the lift and drag serve as tension on the first control strings 30 and the second control string 40. The floating object 2 is controlled to move to an area above the second base body 4 and is fixed when lengths of the first control strings 30 from the first base body 3 to the floating object 2 are about the same as a distance between the first base body 3 and the second base body 4, for example.

Next, in order to increase an elevation angle $\phi$ (an angle of the floating body 21 with respect to a direction W of the wind shown in FIG. 1) of the floating object 2 to generate sufficient lift, control of the posture including at least control of the front/rear inclination angle $\theta$ is carried out. The floating object 2 moves upward or sideways away from the second base body 4 due to the lift. In this state, what is important is that the floating object 2 effectively catches the wind and that the lift (and the drag) is (are) large, because the lengths of the first control strings 30 are maintained substantially constant. Therefore, the floating object 2 that obtained the large lift moves away from the second base body 4 while pulling the second control string 40 with strong force. As a result, the second winding device 43 rotates in the one direction (e.g., clockwise), the rotation is transmitted to the second power generating device 44, and the second power generating device 44 operates as a electricity generator to generate electric power. For example, the electric power generated during the electricity generation is temporarily stored in a battery of the second control device 45 and is sent out to the outside (to a power transmission plant, a factory, or the like in distant places), while a portion of the electric power is used as electric power for respective portions defining the power generator 1.

When the floating object 2 moves to a point at a predetermined maximum distance away from the second base body 4, control of the posture including at least control of the front/rear inclination angle $\theta$ is carried out so as to reduce the elevation angle of the floating object 2 to reduce the lift and the drag. More specifically, the strings 30bl and 30br out of the first control strings 30 arranged to control the rear portion of the floating object 2 are forced forward, i.e., reeled out to make the elevation angle $\phi$ around 0° or are further reeled out to free the rear ends thereof. In this state, by bringing the second power generating device 44 into operation as a motor, the second winding device 43 rotates in the other direction (e.g., counterclockwise) and the second control string 40 is taken up to draw the floating object 2. When the floating object 2 approaches a point at a predetermined minimum distance from the second base body 4, the strings 30bl and 30br are forced backward, i.e., drawn again to carry out the operation for the electricity generation described above.

In this manner, by maintaining the lengths of the first control strings 30 substantially constant, the floating object 2 is allowed to effectively catch the wind to make the most of the energy of the wind, the control of the posture including at least the control of the front/rear inclination angle $\theta$ of the floating object 2 is carried out with the first control strings 30, and reeling out and taking up (drawing) of the second control string 40 are repeated alternately to generate electric power. In this way, it is possible to generate electric power with high power generation efficiency.

The power generator 1 according to the first preferred embodiment can be modified in the following manner.

For example, although the first power generating device 34 operates only as a motor and therefore a motor function is only required, the first power generating device 34 may be enabled to generate electric power when the first control strings 30 are reeled out and the first winding device 33 rotates in the one direction. In other words, while controlling the front/rear inclination of the floating object 2 with the first control strings 30 and reeling out and taking up the first control strings 30 according to the front/rear inclination, it is possible to bring the first motor generator 34 into operation also as an electricity generator to generate electric power. In this way, if the length of the second control string 40 is maintained substantially constant when the wind is blowing substantially from the second base body 4 toward the first base body 3, it is possible that the floating object 2 that has obtained the lift pulls the first control strings 30 and rotates the first winding device 33 in the one direction to generate electric power.

Figure 6:
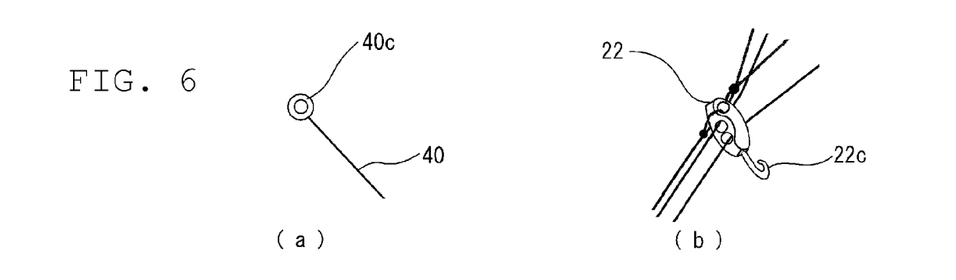
FIGS. 6A and 6B are schematic views for explaining a variation of the above power generator.

In such a case where the first power generating device 34 is enabled to operate also as an electricity generator, a mechanism arranged to select connection or disconnection between the second control string 40 and the posture control instrument 22 may be provided to carry out electricity generation by only reeling out the first control strings 30 and rotating the first winding device 33. For example, as shown in FIGS. 6A and 6B, a ring-shaped metal fitting 40c is provided to a tip end of the second control string 40 and a hook-shaped portion 22c to and from which the metal fitting 40c can be attached and detached is formed on the posture control instrument 22. In a case where the metal fitting 40c is detached from the posture control instrument 22 to disconnect the second control string 40 and the posture control instrument 22 from each other, the first control strings 30 are reeled out and the first winding device 33 rotates in the one direction to generate electric power when the floating object 2 moves following wind pressure (dragged in the direction of the wind). While controlling the front/rear inclination of the floating object 2 with the first control strings 30, the reeling out and taking up operations of the first control strings 30 are carried out according to the front/rear inclination to thereby generate electric power with only the first control strings 30. This operation is not a main idea of the present invention and therefore details of the operation are not described herein but are the same as described in Japanese Patent No. 4208153 discussed above. This operation has an advantage that the wind pressure received in a case where the wind is extremely strong is substantially suppressed to reduce the power generation efficiency on purpose to generate electric power conforming to a predetermined rating in the overall base bodies.

The number of the first control strings 30 and that of the posture control strings 20 can be increased or decreased. For example, in order to finely control the posture and the shape (shape with different effective wind receiving areas) of the floating body 21, the number of the first control strings 30 and that of the posture control strings 20 may be increased, or the front portion control string 30f forming the first control strings 30 may be divided into two so as to individually control the front left and the front right. Alternatively, if a communication device or a device equivalent to the forward/backward movement control device 32 described above is arranged to be mounted to the posture control instrument 22 to communicate with the first base body 3 so as to directly control the posture (the front/rear inclination angle θ or the right/left posture) of the floating body 21 by using the posture control strings 20, it is possible to decrease the number of the first control strings 30 to one, for example. That is, in various preferred embodiments of the present invention, the number of first control strings 30 can be only one, can be only two, or can be more than two.

Further alternatively, the second winding device 43, the second power generating device 44, and the second control device 45 may be disposed in the first base body 3, and the second control string 40 passed from the second control string take-in device 41 in the second base body 4 may be received in the first base body 3. In this case, many of the components of the power generator 1 may be disposed close to each other and become easy to monitor and maintain.

Next, a power generator 1A according to another preferred embodiment of the present invention will be described. The power generator 1A is configured by adding a third control string 50 connected to a third base body 5 and the floating object 2 to the structure of the above-described power generator 1 as shown in a side schematic diagram in FIG. 7A and a plan schematic diagram in FIG. 7B. The third base body 5 is installed in a position apart from the first base body 3 and the second base body 4 so that they define a triangle shape in a plan view. Housed in a case 5a of the third base body 5 are, similarly to the second base body 4, a third control string take-in device 51 arranged to take in the third control string 50 connected to the floating object 2, a third winding device 53 around which a proximal end of the third control string 50 is wound via the third control string take-in device 51, which rotates in one direction when the third control string 50 is reeled out, and which rotates in the other direction to take up the third control string 50, a third power generating device 54 arranged to control rotation of the third winding device 53 and operating as an electricity generator when the third winding device 53 rotates in the one direction, and a third control device 55 arranged to control these respective portions described above and communicating with the first base body 3 or the second base body 4. Details of the respective portions of the third base body 5 are similar to those of the respective corresponding portions of the second base body 4 described above.

Figure 7:
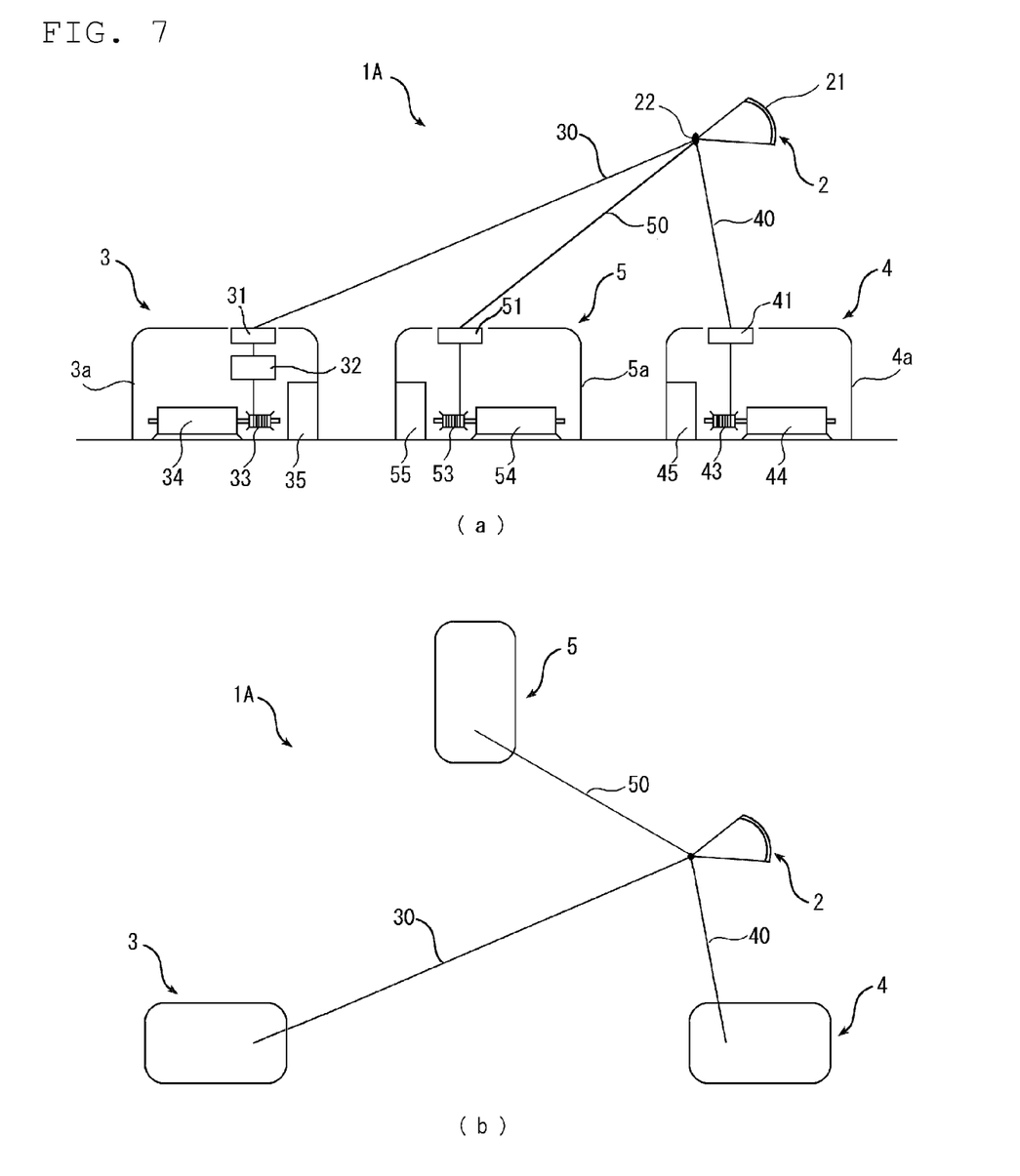
FIGS. 7A and 7B are a side schematic diagram and a plan schematic diagram each showing a general structure of a power generator according to a second preferred embodiment of the present invention.

Operations related to the first base body 3 and the second base body 4 in the power generator 1A are similar to those in the power generator 1. In the third base body 5, electricity generation is carried out with the third control string 50 reeled out as the floating object 2 moves away due to the lift. Preferably, while maintaining the lengths of the first control strings 30 substantially constant, the floating object 2 is moved sideways between points above the second base body 4 and the third base body 5, i.e., moving away from the second base body 4 and moving away from the third base body 5 are repeated alternately to generate electric power. In this way, it is possible to shorten time periods not contributing to electricity generation. Similarly to the power generator 1, above-described modifications to the preferred embodiments are possible.

The power generators according to the preferred embodiments of the present invention have been described above. The present invention is not limited to those described in the preferred embodiments, but various modifications in design can be made within the scope of matters described in the claims. For example, it is of course possible to suitably change the shapes and the structures of the floating object and the base bodies described in the preferred embodiments. To accurately detect the position of the floating object, the floating object may be provided with a camera, an acceleration meter, an inclination detector, an anemometer, a GPS, a flashing light, a computer, or the like, or the base bodies may be provided with cameras. Moreover, a floating object having a lightning rod may be provided and positioned at a higher altitude than the floating object described in each of the preferred embodiments. Furthermore, four or more base bodies may be provided or two or more floating objects may be provided to construct a complicated electric power generation system to which the present invention is applied.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A power generator comprising:
a floating object arranged to catch wind to float and including a floating body arranged to catch the wind, a plurality of posture control strings connected to a plurality of positions of the floating body near an outer periphery of the floating body, and a posture control instrument to which at least a portion of the plurality of the posture control strings is connected;
at least one first control string including a portion that includes a tip end connected to the posture control instrument;
a first control string take-in device arranged to take the at least one first control string into a first base body;
a forward/backward movement control device arranged to control respective forward/backward movements of the plurality of posture control strings;
a first winding device around which a proximal end of the at least one first control string is wound, which rotates in one direction when the at least one first control string is reeled out, and which rotates in another direction to take up the at least one first control string;
a second control string including a tip end connected to the posture control instrument;
a second control string take-in device arranged to take the second control string into a second base body installed apart from the first base body; and
a second winding device around which a proximal end of the second control string is wound, which rotates in one direction to generate electric power when the second control string is reeled out, and which rotates in another direction to take up the second control string; wherein
the at least one control string or the posture control instrument that mounts a communication device is arranged to control at least front/rear inclination of the floating body, and reeling out and taking up operations of the second control string are carried out according to the front/rear inclination to generate electric power.

2. The power generator according to claim 1, further comprising:
- a third control string including a tip end connected to the posture control instrument;
- a third control string take-in device arranged to take the third control string into a third base body installed apart from the first base body and the second base body; and
- a third winding device around which a proximal end of the third control string is wound, which rotates in one direction to generate electric power when the third control string is reeled out, and which rotates in another direction to take up the third control string; wherein
- the reeling out and taking up operations of the third control string are carried out according to the front/rear inclination to generate electric power.

3. The power generator according to claim 2, wherein another portion of the at least one first control string, which is not connected to the posture control instrument, passes through a through hole formed in the posture control instrument.

4. The power generator according to claim 1, wherein the at least one first control string includes only one first control string.

5. The power generator according to claim 1, wherein the at least one first control string includes only two first control strings.

6. The power generator according to claim 1, wherein the at least one first control string includes more than two first control strings.

7. The power generator according to claim 2, wherein the first winding device rotates in the one direction to generate electric power when the at least one first control string is reeled out.

8. The power generator according to claim 7, further comprising a mechanism arranged to selectively connect or disconnect the second control string and the posture control instrument.

9. The power generator according to claim 1, wherein the first winding device rotates in the one direction to generate electric power when the at least one first control string is reeled out.

10. The power generator according to claim 9, further comprising a mechanism arranged to selectively connect or disconnect the second control string and the posture control instrument.

11. The power generator according to claim 1, wherein another portion of the at least one first control string, which is not connected to the posture control instrument, passes through a through hole formed in the posture control instrument.

12. The power generator according to claim 11, wherein the first winding device rotates in the one direction to generate electric power when the at least one first control string is reeled out.

13. The power generator according to claim 12, further comprising a mechanism arranged to selectively connect or disconnect the second control string and the posture control instrument.

* * * * *